US011214292B2

(12) United States Patent
De Simone

(10) Patent No.: US 11,214,292 B2
(45) Date of Patent: Jan. 4, 2022

(54) CAR CONTROL METHOD AND SYSTEM

(71) Applicant: FERRARI S.p.A., Modena (IT)

(72) Inventor: Raffaele De Simone, Modena (IT)

(73) Assignee: FERRARI S.P.A., Modena (IT)

( * ) Notice: Subject to any disclaimer, the term of this patent is extended or adjusted under 35 U.S.C. 154(b) by 174 days.

(21) Appl. No.: 16/724,648

(22) Filed: Dec. 23, 2019

(65) Prior Publication Data

US 2020/0207399 A1    Jul. 2, 2020

(30) Foreign Application Priority Data

Dec. 27, 2018 (IT) .......................... 102018000021097

(51) Int. Cl.
| | | |
|---|---|---|
| *B62D 1/12* | (2006.01) | |
| *B62D 6/00* | (2006.01) | |
| G05G 9/047 | (2006.01) | |
| B62D 1/14 | (2006.01) | |
| B62D 1/22 | (2006.01) | |

(52) U.S. Cl.
CPC .............. *B62D 1/12* (2013.01); *B62D 6/00* (2013.01); *B62D 1/14* (2013.01); *B62D 1/22* (2013.01); *B62D 6/002* (2013.01); *G05G 9/047* (2013.01)

(58) Field of Classification Search
CPC ... B62D 1/12; B62D 6/00; B62D 1/22; B62D 1/14; B62D 6/002; G05G 9/047
See application file for complete search history.

(56) References Cited

U.S. PATENT DOCUMENTS

| 5,598,742 | A | 2/1997 | Kim | |
|---|---|---|---|---|
| 5,800,267 | A * | 9/1998 | Carlson | ................. G05G 9/047 345/161 |
| 6,006,852 | A | 12/1999 | Eckstein et al. | |
| 6,636,197 | B1 * | 10/2003 | Goldenberg | ............. G05G 1/08 345/156 |
| 7,021,416 | B2 | 4/2006 | Kapaan et al. | |
| 9,174,664 | B2 * | 11/2015 | Gaedke | .................... B62D 1/12 |
| 10,118,688 | B2 * | 11/2018 | Voiles | .................... G05G 9/047 |
| 2001/0047235 | A1 | 11/2001 | Mardberg | |
| 2005/0057031 | A1 | 3/2005 | Ahnafield | |
| 2005/0236896 | A1 | 10/2005 | Offerle et al. | |
| 2009/0198414 | A1 | 8/2009 | Mohning et al. | |

FOREIGN PATENT DOCUMENTS

WO      2016042405 A1    3/2016

OTHER PUBLICATIONS

Search Report and Written Opinion for IT Application No. 201800021097 dated Oct. 11, 2019, 8 pages.

* cited by examiner

*Primary Examiner* — Jacob D Knutson
*Assistant Examiner* — Marlon A Arce
(74) *Attorney, Agent, or Firm* — Cantor Colburn LLP

(57) ABSTRACT

A control method and system to control a car; the following steps are carried out: determining a position of a joystick, which is designed to be grabbed by a hand of a driver of the car; adjusting a longitudinal motion and a transverse motion of the car as a function of the position of the joystick; determining a position of at least one pedal, which is designed to be pressed by a foot of the driver of the car; and controlling a dynamic behaviour of the car, which is different from the longitudinal motion and from the transverse motion, a function of the position of the pedal.

17 Claims, 6 Drawing Sheets

CAR CONTROL METHOD AND SYSTEM

CROSS-REFERENCE TO RELATED APPLICATIONS

This patent application claims priority from Italian patent application no. 102018000021097 filed on Dec. 27, 2018, the entire disclosure of which is incorporated herein by reference.

TECHNICAL FIELD

The invention relates to a car control method and system.

PRIOR ART

Cars are generally controlled by means of a steering wheel. In the past and because of merely stylistic issues, manufacturers used to offer steering wheels with the shape of an aircraft yoke, though without allowing the steering wheel to move backward and forward, since it evidently is not possible to control the pitch of a car.

The steering wheel was necessary to allow for a reduction of the stress of the arms of the driver. Over the decades, servo-mechanisms were introduced to control the steering, said servo mechanisms being, at first, hydraulic and, more recently, electric. Therefore, a reduction of the size of the steering wheel was possible.

In the industrial field, a joystick is known, which is used to control forklifts. However, these vehicles feature dynamics that are very different from the ones of a car, especially of a sports car, and, therefore, the relative control system is designed to move the forklifts in very small spaces and at very low speeds.

Patent application EP3561635A1 describes a method to control a car using a joystick, which allows both the movement/stopping of the car and the trajectory followed by the car to be controlled; in particular the forward or backward tilt angle of the joystick lever causes a corresponding forward or backward acceleration of the car (forward to increase the speed of the car or backward to reduce the speed of the car), whereas the lateral tilt angle (to the right or to the left) of the joystick lever causes a corresponding steering of the car.

Patent U.S. Pat. No. 6,006,852A discloses a method to control a car using: a joystick, which is laterally tilted to control the lateral movement of the car, a button connected to the joystick, which is pressed to adjust a positive longitudinal acceleration of the car, and a pedal, which is pressed to adjust a negative longitudinal acceleration (i.e. a braking) of the car.

Patent application US2009198414A1 discloses a method to control a car using: a joystick, which is laterally tilted to control the lateral movement of the car and is tilted forward to adjust a positive longitudinal acceleration of the car, and a pedal, which is pressed to adjust a negative longitudinal acceleration (i.e. a braking) of the car.

DESCRIPTION OF THE INVENTION

The object of the invention is to provide a car control method and system, which allow for an increase in the ability to control the motion of the car (especially in a sports driving mode) in a simple and intuitive fashion (namely, in an ergonomic manner) and, at the same time, are simple and economic to be implemented and manufactured.

According to the invention, there are provided a car control method and system according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
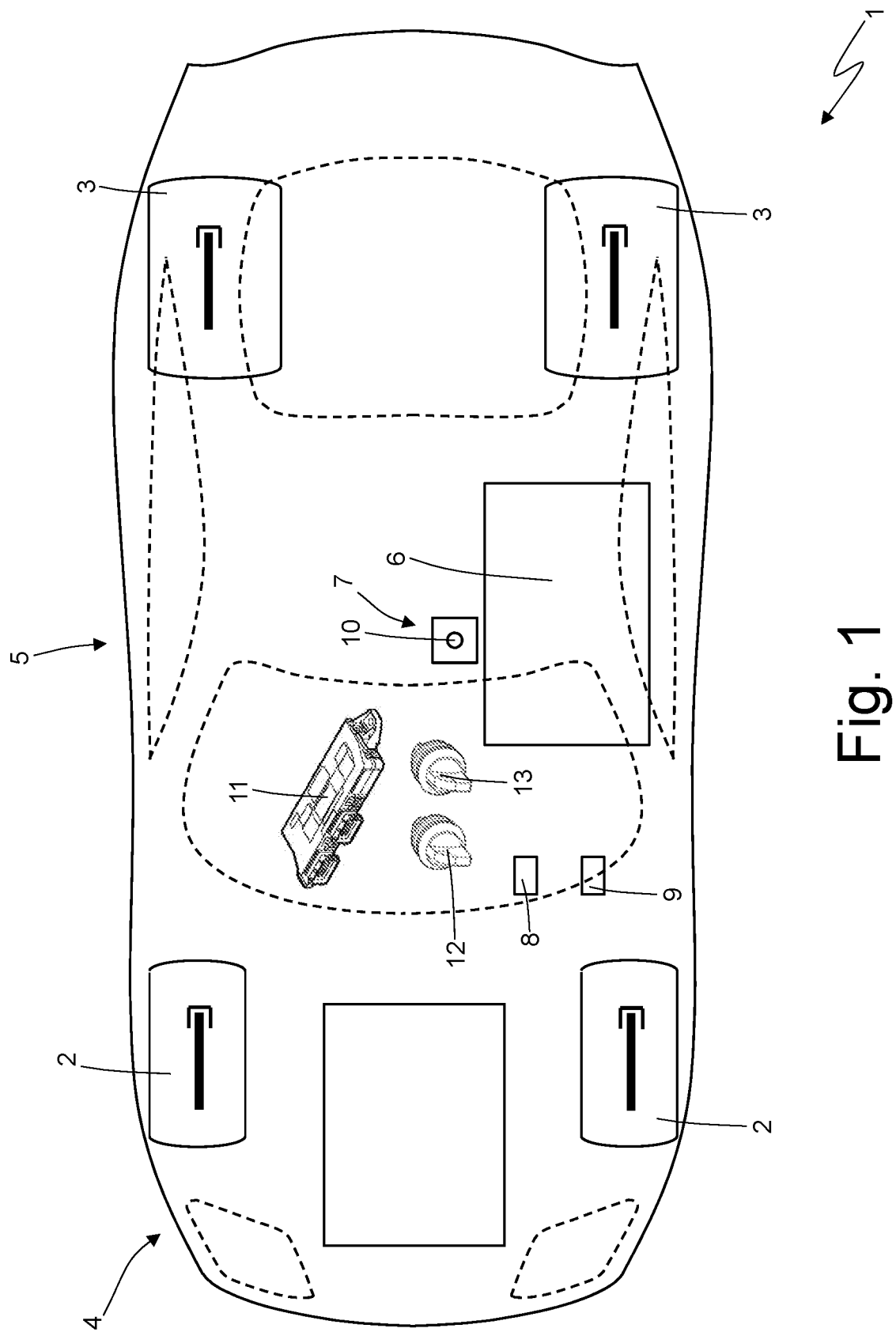
FIG. 1 is a schematic plan view of a car provided with a control system according to the invention.

In FIG. 1, number 1 indicates, as a whole, a car provided with two front wheels 2 and two rear drive wheels 3, which receive the torque from a powertrain system 4. The powertrain system 4 can be an exclusively heat-based system (namely, solely comprising an internal combustion heat engine), a hybrid system (namely, comprising an internal combustion heat engine and at least one electric motor) or an electric system (namely, solely comprising one or more electric motors).

Figure 2:
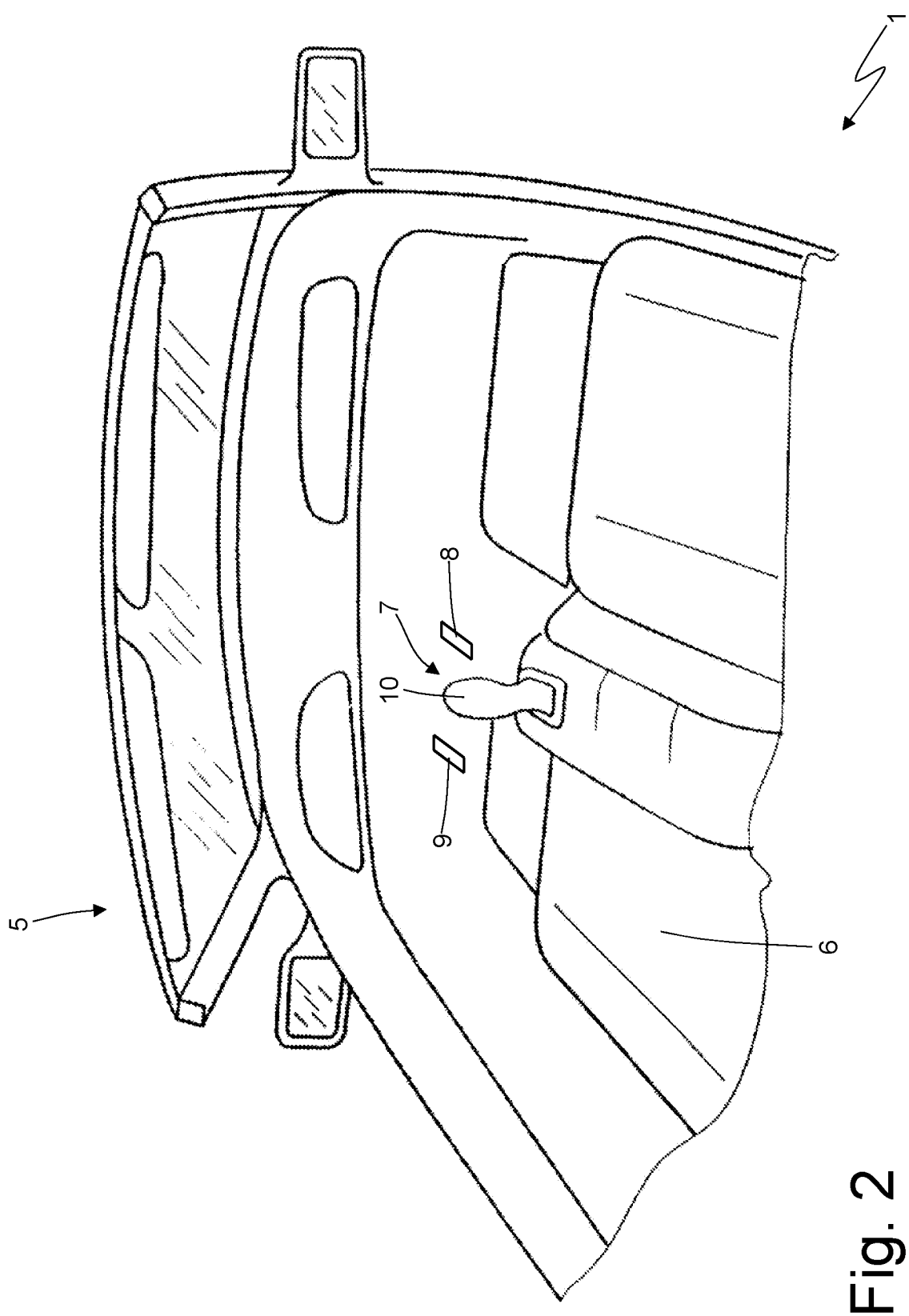
FIG. 2 is a schematic view of part of a passenger compartment of the car of FIG. 1.

The car 1 comprises a passenger compartment 5 (which is better shown in FIG. 2), where a driving position is obtained, which is designed to accommodate a driver of the car 1.

Figure 3:
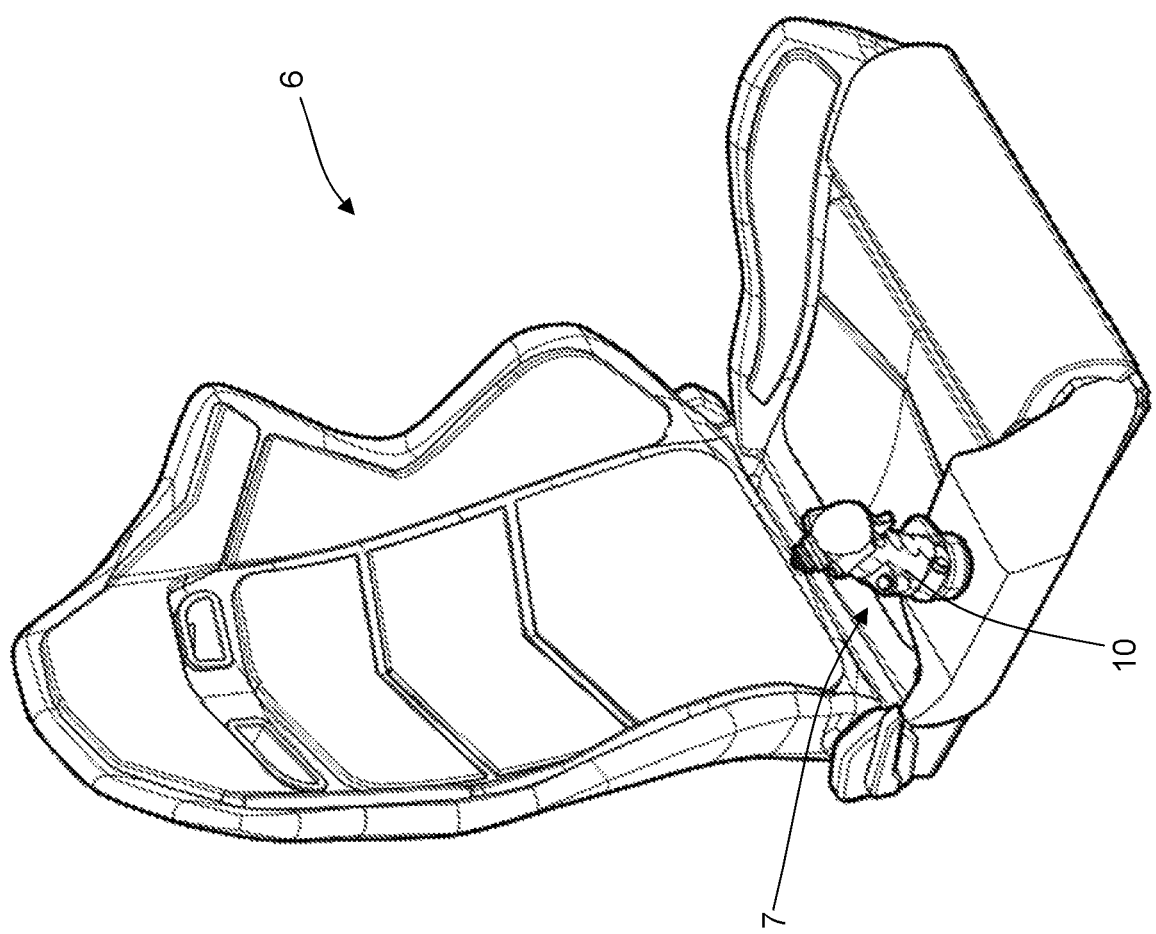
FIG. 3 is a perspective view of a driver's seat of the car of FIG. 1.

The driving position comprises a seat 6 (which is better shown in FIG. 3) and a joystick 7, which is arranged beside the seat 6 so that it can easily and comfortably be grabbed by the driver seating in the seat 6. In the embodiment shown in the accompanying figures, the joystick 7 is arranged on the right side of the seat 6; according to other embodiments which are not shown herein, the joystick 7 is arranged on the left side of the seat 6 or two joysticks 7 are provided, which are arranged on the right and on the left and are alternative to one another (namely, the driver can choose whether to use the joystick 7 on the right or the joystick 7 on the left).

Furthermore, the driving position comprises two pedals 8 and 9, which are arranged on the floor of the passenger compartment 5 in front of the seat 6 and are designed to be pressed by the feet of the driver (obviously, the right foot of the driver presses the right pedal 8, whereas the left foot of the driver presses the left pedal 9). In particular, the tow pedals 8 and 9 are completely separated from and independent of the joystick 7 (both structurally and functionally) and are designed to be pressed only by the feet of the driver of the car 1; in other words, the pressing of the two pedals 8 and 9 is carried out only by the feet of the driver of the car 1 and is completely independent of the movement of the joystick.

Figure 4:
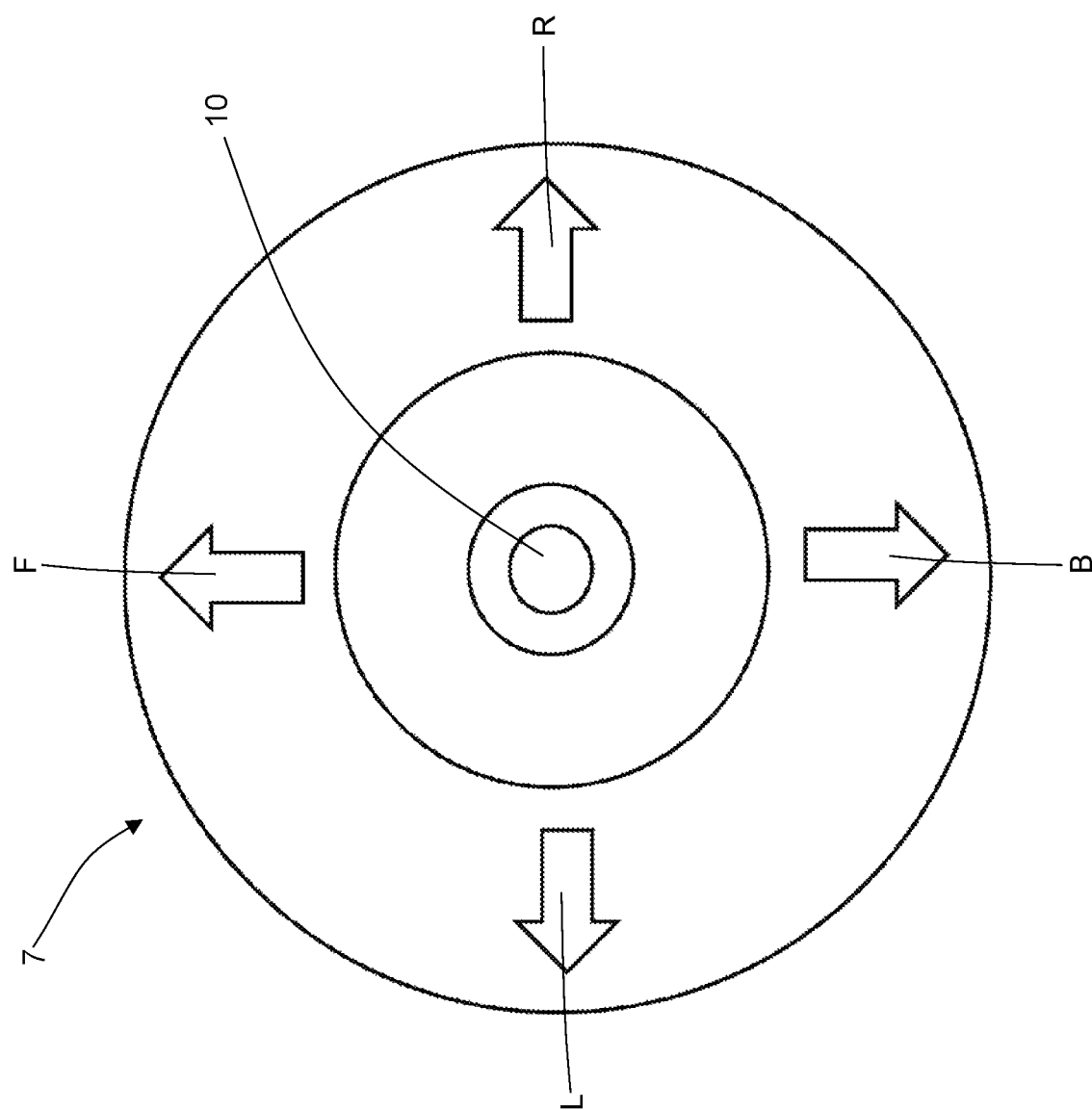
FIG. 4 is a schematic plan view of a joystick of the control system.
Figure 5:
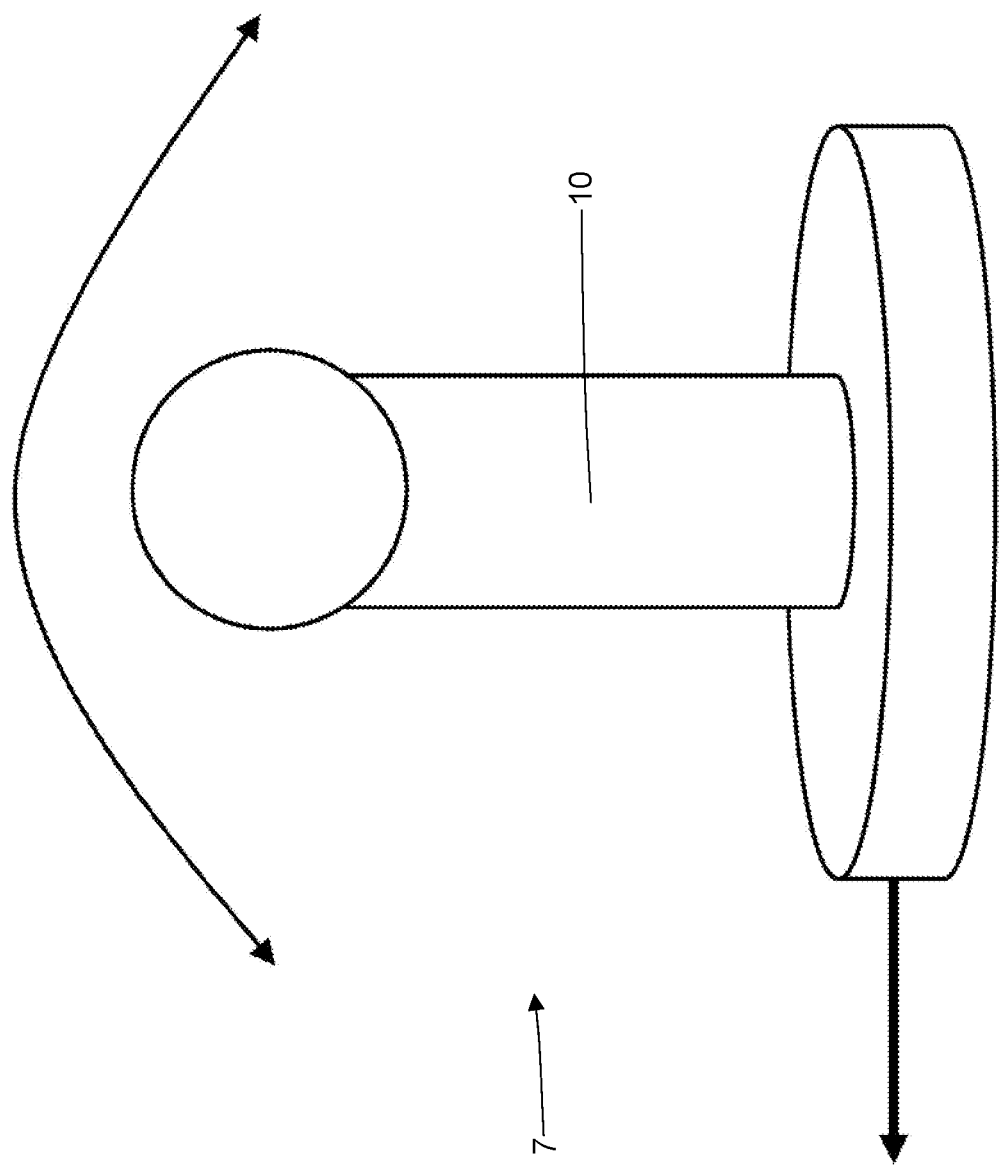
FIG. 5 is a schematic side view of the joystick of FIG. 4.

According to FIGS. 4 and 5, the joystick 7 is provided with a grabbable lever 10, which can be tilted longitudinally (namely, forward or backward) or transversely (namely, to the right or to the left). In other words, the lever 10 can be tilted forward (according to the direction indicated by arrow F in FIG. 4), the lever 10 can be tilted backward (according to the direction indicated by arrow B in FIG. 4), the lever 10 can be tilted to the right (according to the direction indicated by arrow R in FIG. 4), and the lever 10 can be tilted to the left (according to the direction indicated by arrow L in FIG. 4).

Obviously, the lever 10 can also be inclined combining a longitudinal movement with a transverse movement, namely the lever 10 can freely be tilted in all the directions contained in a horizontal plane.

The car 1 comprises an electronic control unit 11 (schematically shown in FIG. 1), which is connected to the joystick 7 (namely, to the position sensors of the joystick 7 detecting the position of the lever 10 of the joystick 7) and controls the powertrain system 4, the braking system and the steering system of the front wheels 2 as a function of the commands given by the driver through the joystick 7. In particular, the forward and backward movement of the lever 10 of the joystick 7 allows the forward driving and the braking of the car 1, respectively, to be controlled: by pushing the lever 10 of the joystick 7 forward, the acceleration of the car 1 is progressively increased, increasing the torque applied by the powertrain system 4 to the rear drive wheels 2, whereas, by pushing the lever 10 of the joystick 7 backward, the braking force applied by the braking system to the wheels 2 and 3 is progressively increased; in this way, the longitudinal acceleration is positive when the lever 10 of the joystick 7 is pushed forward and is negative when the lever 10 of the joystick 7 is pushed backward. As a consequence, when the lever 10 of the joystick 7 is released (namely, when it is pushed neither forward nor backward), the car 1 proceeds at a constant speed, namely it is subjected to a zero longitudinal acceleration.

According to a possible embodiment, the control mode can be changed as a function of the driving speed of the car 1. For example, when a driving speed threshold—e.g. 30 km/h—is exceeded, the forward tilt angle of the lever 10 of the joystick 7 imparts a positive acceleration, whereas, below the speed threshold, the forward tilt angle of the lever 10 of the joystick 7 imparts a driving speed, so that, by releasing the lever 10 of the joystick 7, the car 1 is caused to stop, which means that the backward braking acceleration (which, hence, is negative) depends on the rapidity with which the lever 10 of the joystick 7 is brought back to the rest position.

On the other hand, above the aforesaid driving speed, the greater the backward tilt angle of the lever 10 of the joystick 7, the more intense the negative acceleration, i.e. the braking.

According to another embodiment, the switching between the control in terms of acceleration and the control in terms of speed is handled not by means of the driving speed threshold, but by means of another control, for example a bistable button, or by means of a sensor associated with an axial pressing of the lever 10 of the joystick 7, which, hence, defines a monostable button, which, with each pressing, switches from one mode to the other.

As described above, the lever 10 of the joystick 7 can also be moved to the right and to the left, thus controlling the trajectory of the car 1, namely controlling the degree of steering of the car 1.

According to a possible embodiment, the lateral tilt angle of the lever 7 of the joystick 10 directly corresponds to the steering angle. Furthermore, the proportionality factor, namely the function linking the angle of the lever 10 of the joystick 7 to the steering angle, also is an inverse function of the driving speed of the car 1.

According to a different embodiment, a lateral tilt angle of the lever 10 of the joystick 7 identifies a rapidity with which the actuator of the steering system intervenes. Therefore, the release of the lever 10 of the joystick 7 leaves the steering angle unchanged.

Preferably, the proportionality factor between the tilt angle of the lever 10 of the joystick 7 and the rapidity with which the steering angle changes is reduced proportionally to the speed of the car 1, so as to make the operation of the steering control "parametric".

According to a further embodiment of the invention, the two steering angle control modes can be enabled alternatively based on a bistable or monostable button or based on a driving speed threshold (in particular, when the driving speed threshold is exceeded, the system switches from an angle control to a steering angle changing rapidity control.

According to FIG. 1, the car 1 comprises a selector 12 (the so-called "Manettino"), which can be operated by the driver and allows the desired driving mode to be selected; for example, the selector 12 allows the driver to select a "city" driving mode, a "highway" driving mode, a "wet" driving mode and a "racing" driving mode (namely, for a high-performance driving experience on track).

Obviously, the selector 12 can be a physical device or a virtual device.

In use, the control unit 11 cyclically determines: a position of the lever 10 of the joystick 7 (in particular, a longitudinal position of the lever 10 of the joystick 7 and a transverse position of the lever 10 of the joystick 7), a position of the pedal 8 and a position of the pedal 9. As already mentioned above, the control unit 11 adjusts a motion of the car 1 as a function of the position of the lever 10 of the joystick 7 (in particular, the control unit 11 adjusts a longitudinal motion of the car 1 as a function of the longitudinal position of the lever 10 of the joystick 7 and adjusts a transverse motion of the car 1 as a function of the transverse position of the lever 10 of the joystick 7).

When the driver chooses a non-"racing" driving mode by means of the selector 12, the control unit 11 does not use the position of the pedals 8 and 9 or uses the position of the pedals 8 and 9 to interact with an infotainment system of the car 1 (for example, the right pedal 8 could be used to select an item from a menu among a plurality of items and the left pedal 9 could be used to activate the item previously selected through the right pedal 8).

When the driver chooses a "racing" driving mode by means of the selector 12, the control unit 11 uses the position of the pedals 8 and 9 to control a dynamic behaviour of the car 1, which is different from the longitudinal motion and from the transverse motion (the longitudinal motion and the transverse motion are controlled using the joystick 7); namely, the pedals 8 and 9 can be used by the driver to obtain changes in the dynamic behaviour of the car 1 in addition to what allowed by the sole action upon the lever 10 of the joystick 7.

Figure 6:
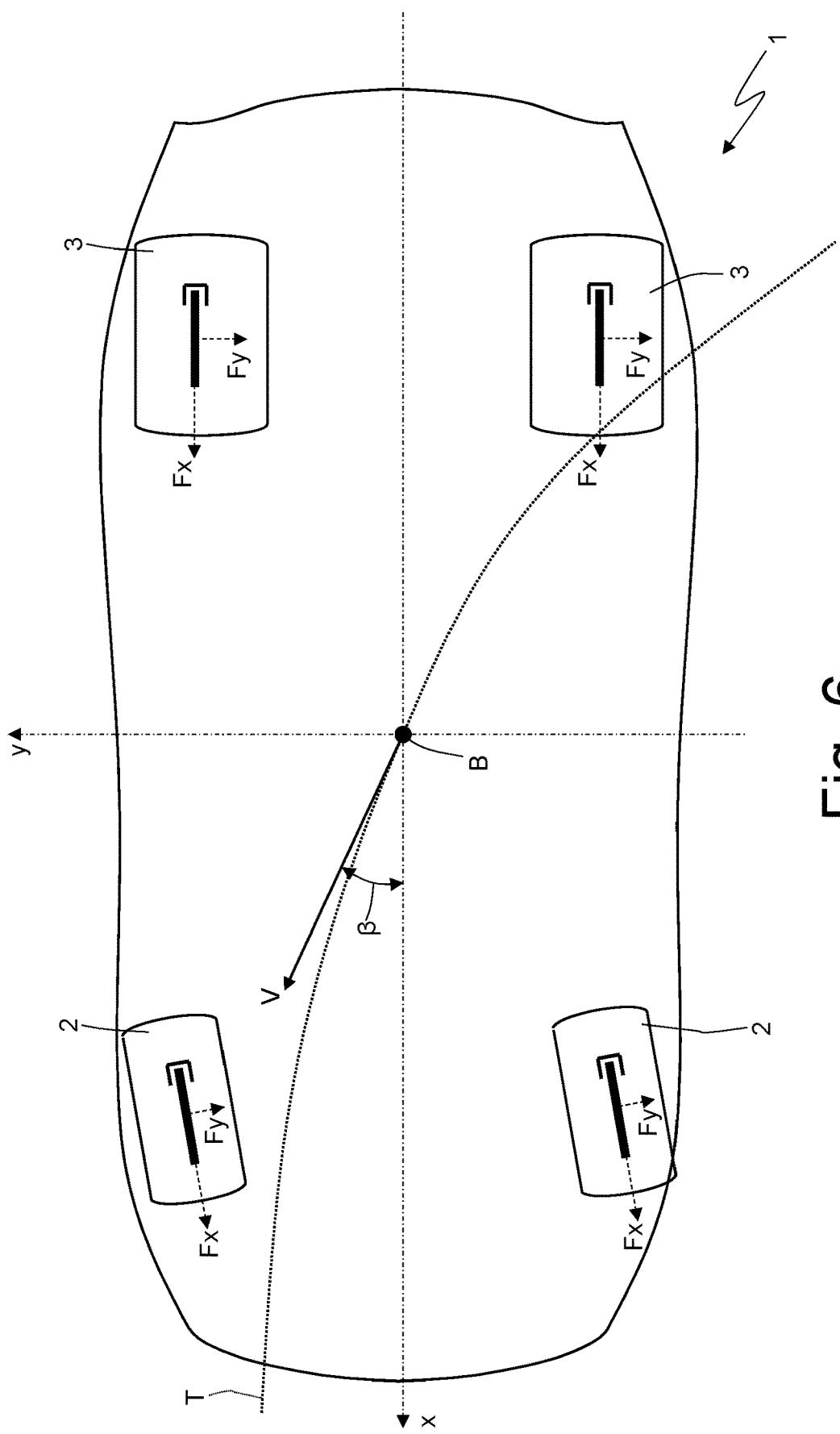
FIG. 6 is a schematic view of the car of FIG. 1 while driving along a curve, highlighting the trajectory, the driving speed and the attitude angle.

According to FIG. 6, when driving along a curve, the control unit 11 can control (adjust, change, set) the attitude angle β of the road vehicle 1 (namely, the angle comprised between the longitudinal axis x of the road vehicle 1 and the direction of the driving speed V of the road vehicle 1 in the centre of gravity B) as a function of the position of the pedals 8 and 9. In other words, the control unit 11 controls, as a function of the position of the pedals 8 and 9, the attitude angle β of the car 1 driving along a curve, so that the attitude angle β is a function of the position of the pedal 8 and 9.

It should be pointed out that, when driving along a curve, the longitudinal sliding (slip) of the rear drive wheels 3 and the attitude angle β of the car 1 are linked; indeed, when driving along a curve, the occurrence of a longitudinal sliding (slip) of the rear drive wheels 3 implies that the car 1 has an attitude angle β other than zero. The longitudinal sliding (slip) of the rear drive wheels 3 is a function of the difference (or of the ratio) between the peripheral speed of the rear drive wheels 3 in the point of contact with the road surface and the driving speed of the car 1; when the peripheral speed of the rear drive wheels 3 in the point of contact with the road surface is identical to the driving speed of the car 1, then the longitudinal sliding (slip) of the rear drive wheels 3 is equal to zero, and the longitudinal sliding (slip) of the rear drive wheels 3 increases as the difference between the peripheral speed of the rear drive wheels 3 in the point of contact with the road surface and the driving speed of the car 1 increases. The lateral force Fx generated by the tyres of the wheels 2 and 3 of the car 1 increases, at first, as the attitude angle β increases (beyond a given value of the attitude angle β, the lateral force Fx generated by the tyres of the wheels 2 and 3 of the car 1 decreases as the attitude angle β increases) and always decreases as the longitudinal sliding (slip) increases. While driving along a curve, the lateral force Fx to be generated by the tyres 2 and 3 of the car 1 basically is a function of the bending radius and of the driving speed; hence, a same lateral force Fx of the tyres of the wheels 2 and 3 can be generated with a zero longitudinal sliding (slip) and with a zero attitude angle β or it can be generated with a (relatively) high longitudinal sliding (slip) and, hence, with a corresponding (relatively) high attitude angle β.

In other words, the car 1 has a rear-wheel drive and, therefore, while driving along a curve, it has an oversteering behaviour: causing the slip of the rear drive wheels 3 when moving along a curve, the car 1 is allowed to drive along the curve itself with a given attitude angle β (i.e. with the car 1 rotated towards the inside of the curve) and with the tyres of the wheels 2 and 3 sliding towards the outside of the curve, Driving along a curve when the rear drive wheels 3 are slipping is a particularly complicated operation, since, in this condition, the dynamic balance of the car 1 is particularly unstable and can easily lead to a 180° spin; as a consequence, this driving operation, which is very spectacular and highly appreciated by drivers, is normally performed only by professional or semi-professional drivers; on the other hand, using the pedals 8 and 9, even a relatively inexperienced driver can simply and safely ask the car 1 to set an attitude angle β other than zero.

According to a preferred embodiment, when the pedals 8 and 9 are pressed to obtain an attitude angle β other than zero, the control unit 11 determines a desired attitude angle β as a function of the position of the pedals 8 and 9 and controls the generation of the torque so as to cause the car 1 to have the desired attitude angle β when driving along the curve; for example, the control unit 11 could determine a desired longitudinal sliding of the rear drive wheels 3 as a function of the desired attitude angle β and, therefore, it could control the generation of the torque so as to cause the rear drive wheels 3 to have the desired longitudinal sliding while driving along the curve.

According to a preferred embodiment, the control unit 11 determines a maximum attitude angle $\beta_{MAX}$ while driving along each curve so as avoid the loss of control of the car 1 (obviously, with an adequate degree of safety that allows the car 1 to remain in stable conditions) and, then, causes a zero attitude angle β to correspond to the absence of action of the driver upon the pedals 8 and 9 and causes the maximum attitude angle $\beta_{MAX}$ to correspond to the maximum action of the driver upon the pedals 8 and 9; hence, in a curve, the maximum action of the driver upon the pedals 8 and 9 can indicate an attitude angle β of 4° (since the maximum attitude angle $\beta_{MAX}$ is equal to 4°), whereas, in another curve, the maximum action of the driver upon the pedals 8 and 9 can indicate an attitude angle β of 20° (since the maximum attitude angle $\beta_{MAX}$ is equal to 20°).

It should be pointed out that the law linking the position of the pedals 8 and 9 to the attitude angle β can be linear and directly proportional or it can be of a different type (for example, parabolic); namely, by acting upon the pedals 8 and 9, at first, the attitude angle β increases in a relatively quick manner from the zero value in order to then increase much more slowly as the maximum attitude angle $\beta_{MAX}$ gets closer.

In the embodiment shown in the accompanying figures, in order to control the attitude angle β, both pedals 8 and 9 are used, namely the attitude angle β of the car 1 while driving along the curve is controlled as a function of the position of both pedals 8 and 9. In this case, it is possible that, while driving along the curve, the attitude angle β is changed as a function of a misalignment of the pedals 8 and 9, so that the greater the misalignment of the two pedals 8 and 9, the greater the attitude angle β; in other words, the attitude angle β is zero when both pedals 8 and 9 have the same position and becomes greater and greater as the difference between the positions of the two pedals 8 and 9 increases. Alternatively, the attitude angle β of the car 1 driving along a right-turning curve is changed as a function of the position of the sole right pedal 8 and the attitude angle β of the car 1 driving along a left-turning curve is changed as a function of the position of the sole left pedal 8.

The use of both pedals 8 and 9 to control the attitude angle β while driving along a curve is particularly ergonomic, since it is easier and more intuitive for the driver to press (more) the right pedal 8 during a right-turning curve and to press (more) the left pedal 9 during a left-turning curve.

According to a different embodiment, only one single pedal 8 or 9 is used to control the attitude angle β (in this embodiment there could be one single pedal 8 or 9 instead of the pair of pedals 8 and 9).

When one single pedal 8 or 9 is used to control the attitude angle β, the desired attitude angle β is generally assumed to be zero in a completely raised position of the pedal 8 or 9 and the desired attitude angle β is generally assumed to be equal to the maximum attitude angle $\beta_{MAX}$ in a completely pressed position of the pedal 8 or 9.

According to FIG. 1, the car 1 comprises a selector 13, which can be operated by the driver and allows the driver to select what to control by means of the pedals 8 and 9 when the "racing" driving mode was previously selected in the selector 12. Obviously, the selector 13 can be a physical device or a virtual device; furthermore, the selector 13 can be completely independent of the selector 12 or can be built-in in the selector 12 to a great or small extent.

For example, by acting upon the selector 13, the driver can decide (only in the "racing" driving mode) whether the pedals 8 and 9 have to be used to adjust the attitude angle β or whether the pedals 8 and 9 have to be used to adjust other features of the motion of the car 1. For example, alternatively to the control of the attitude angle β, the pedals 8 and 9 could be used to change the distribution of the braking between front brakes and rear brakes or between right brakes and left brakes; in other words, the distribution of the braking between front brakes and rear brakes or between right brakes and left brakes is changed as a function of the position of the pedals 8 and 9.

According to a possible embodiment, a change in the distribution of the braking is assumed to be zero in a completely raised position of the pedal 8 or 9 and the change in the distribution of the braking is assumed to be maximum in a completely pressed position of the pedal 8 or 9.

According to a possible embodiment, the control unit 11 changes the distribution of the braking between front brakes and rear brakes as a function of the position of the sole pedal 8 and changes the distribution of the braking between right brakes and left brakes as a function of the position of the sole pedal 9.

In the "racing" driving mode, drivers can use the pedals 8 and 9 to control the attitude angle β while driving along a curve, they can use the pedals 8 and 9 to control the distribution of the braking, they can use the pedals 8 and 9 to change the modes of intervention of the traction control system, they can use the pedals 8 and 9 to change the position of a movable aerodynamic appendage, they can use the pedals 8 and 9 to change a mapping of the engine control (heat engine or electric motor), they can use the pedals 8 and 9 to adjust the rear differential (namely, to change the distribution of the torque), or they can use the pedals 8 and 9 to adjust the engine brake (obviously, these are mere non-exhaustive examples of the possible use of the pedals 8 and 9).

The embodiments described herein can be combined with one another, without for this reason going beyond the scope of protection of the invention.

The control method described above has different advantages.

First of all, the control method described above allows for an increase in the ability to control the motion of the car 1 (especially in a sports driving mode) in a simple and intuitive manner (namely, in an ergonomic manner).

Furthermore, the control method described above allows the driver to interact with the infotainment system of the car 1 using the feet and, hence, without removing the hand from the lever 10 of the joystick 7.

Finally, the control method described above is particularly simple and economic to be implemented, as the addition of a pair of pedals 8 and 9 to a car is not complicated and can be carried out at a very small cost.

LIST OF THE REFERENCE NUMBERS OF THE FIGURES

1 vehicle
2 front wheels
3 rear wheels
4 powertrain system
5 passenger compartment
6 seat
7 joystick
8 pedal
9 pedal
10 lever
11 control unit
12 selector
13 selector
β attitude angle
B centre of gravity
V speed

The invention claimed is:
1. A control method to control a car (1) comprising the steps of:

determining a position of a joystick (7), which is designed to be grabbed by a hand of a driver of the car (1) and can be tilted longitudinally and transversally;
adjusting a longitudinal motion, namely a forward movement and a braking, of the car (1) as a function of the backward and forward longitudinal movement of the joystick (7); and
adjusting a transverse motion, namely a degree of steering, of the car (1) as a function of the right and left lateral movement of the joystick (7);
determining a position of at least one pedal (8, 9), which is completely separate from and independent of the joystick (7) and is designed to be pressed only by a foot of the driver of the car (1); and
controlling a dynamic behaviour of the car (1), which is different from the longitudinal motion and from the transverse motion, as a function of the position of the pedal (8, 9).

2. The control method according to claim 1, wherein, as a function of the position of the pedal (8, 9), an attitude angle (β) of the car (1) driving along a curve is controlled so that the attitude angle (β) is a function of the position of the pedal (8, 9), namely so that the attitude angle (β) progressively increases as the pressure on the pedal (8, 9) increases.

3. The control method according to claim 2, further comprising:
determining a desired attitude angle (β) as a function of the position of the pedal (8, 9); and
controlling the generation of a torque transmitted to drive wheels (3) of the car (1) so as to cause the car (1) to have the desired attitude angle (β) while driving along the curve.

4. The control method according to claim 3 further comprising:
determining, as a function of the desired attitude angle (β), a desired longitudinal sliding of the rear drive wheels (3), which is meant as difference between a peripheral speed of the rear drive wheels (3) in the point of contact with a road surface and a moving speed of the car (1); and
controlling the generation of the torque so as to cause the rear drive wheels (3) to have the desired longitudinal sliding along the curve.

5. The control method according to claim 2 further comprising:
determining a maximum attitude angle ($\beta_{MAX}$) along the curve so as to avoid the loss of control of the car (1);
assuming that a desired attitude angle (β) is equal to zero in case of lack of action of the driver upon the pedal (8, 9); and
assuming that the desired attitude angle (β) is equal to the maximum attitude angle ($\beta_{MAX}$) in case of maximum action of the driver upon the pedal (8, 9).

6. The control method according to claim 5 further compirising:
assuming that a desired attitude angle (β) is equal to zero in a completely raised position of the pedal (8, 9); and
assuming that the desired attitude angle (β) is equal to the maximum attitude angle ($\beta_{MAX}$) in a completely pressed position of the pedal (8, 9).

7. The control method according to claim 2 further comprising:
determining a position of two pedals (8, 9), which are designed to be pressed by the feet of the driver of the car (1); and controlling the attitude angle (β) of the car (1) while driving along the curve as a function of the position of both pedals (8, 9).

8. The control method according to claim 7, wherein:
the attitude angle (β) of the car (1) when it drives along a right-turning curve is changed as a function of the position of one single right pedal (8); and
the attitude angle (β) of the car (1) while driving along a left-turning curve is changed as a function of the position of one single left pedal (8).

9. The control method according to claim 7, wherein the attitude angle (β) of the car (1) while driving along the curve is changed as a function of a difference between the positions of the two pedals (8, 9) so that the greater the difference between the positions of the two pedals (8, 9), the greater the attitude angle (β).

10. The control method according to claim 1, wherein, as a function of the position of the pedal (8, 9), the distribution of the braking between front brakes and rear brakes or between right brakes and left brakes is changed.

11. The control method according to claim 10 further comprising:
assuming that a change in the distribution of the braking is equal to zero in a completely raised position of the pedal (8, 9); and
assuming that the change in the distribution of the braking is maximum in a completely pressed position of the pedal (8, 9).

12. The control method according to claim 10 further comprising:
determining a position of two pedals (8, 9), which are designed to be pressed by the feet of the driver of the car (1);
changing the distribution of the braking between front brakes and rear brakes as a function of the position of a first pedal (8); and
changing the distribution of the braking between right brakes and left brakes as a function of the position of a second pedal (9).

13. The control method according to claim 1 further comprising:
determining a position of a first selector (13); and
selecting the car dynamic behaviour control mode as a function of the position of the pedal (8, 9) based on the position of the first selector (13).

14. The control method according to claim 1 further comprising:
determining a position of a second selector (12); and
selecting whether to control the car dynamic behaviour as a function of the position of the pedal (8, 9) based on the position of the second selector (12).

15. The control method according to claim 1 further comprising using the position of the pedal (8, 9) to interact with an infotainment system of the car (1) as an alternative to using the position of the pedal (8, 9) to change the motion of the car (1).

16. A system to control a car (1) comprising:
a joystick (7), which is designed to be grabbed by a hand of a driver of the car (1); and
a control unit (11), which is designed to adjust a longitudinal motion, namely a forward movement and a braking, of the car (1) as a function of the backward and forward longitudinal movement of the joystick (7) and is designed to adjust a transverse motion, namely a degree of steering, of the car (1) as a function of the right and left lateral movement of the joystick (7);
wherein there is at least one pedal (8, 9), which is completely separate from and independent of the joystick (7) and is designed to be pressed only by a foot of the driver of the car (1); and
the control unit (11) is designed to control a dynamic behaviour of the car (1), which is different from the longitudinal motion and from the transverse motion, as a function of the position of the pedal (8, 9).

17. A car (1) comprising the control system according to claim 16.

* * * * *